United States Patent Office 3,580,767
Patented May 25, 1971

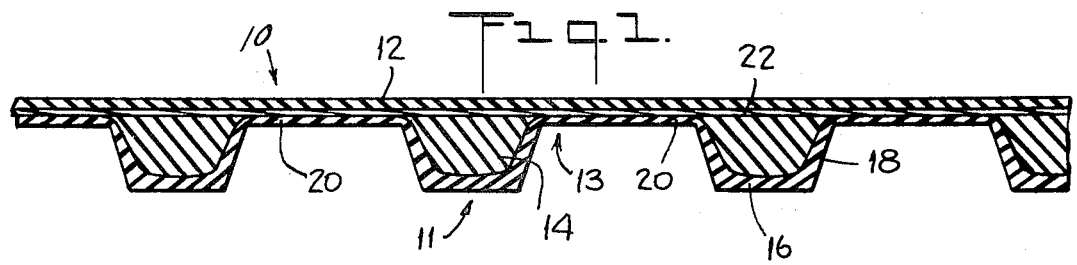
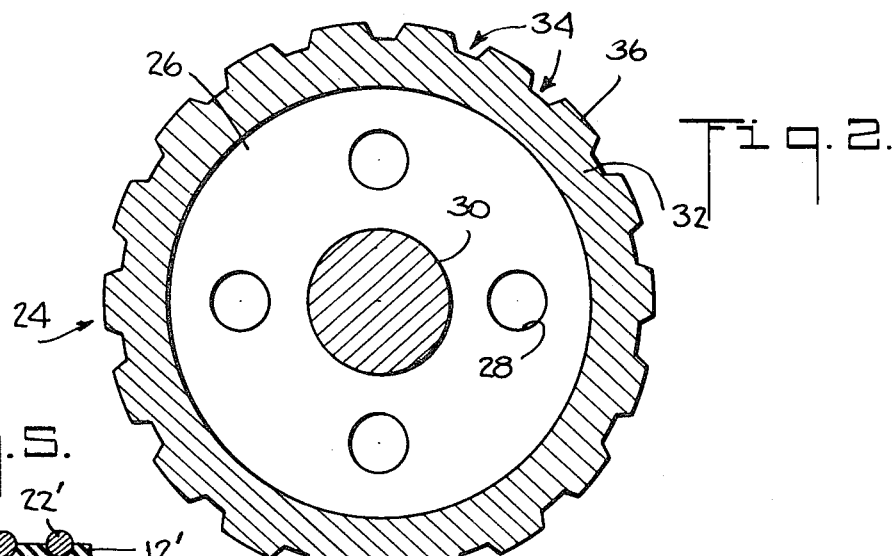
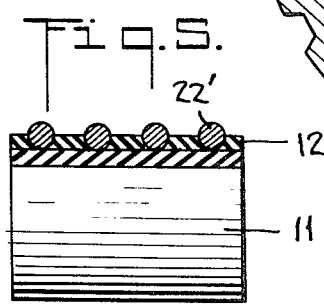
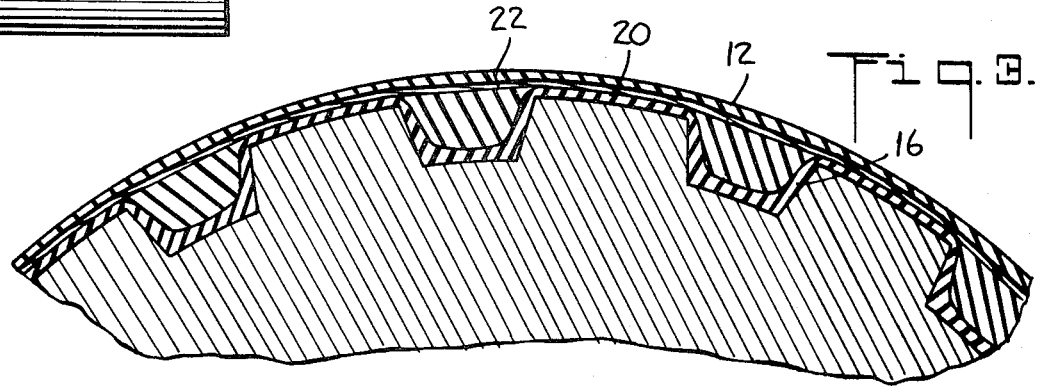
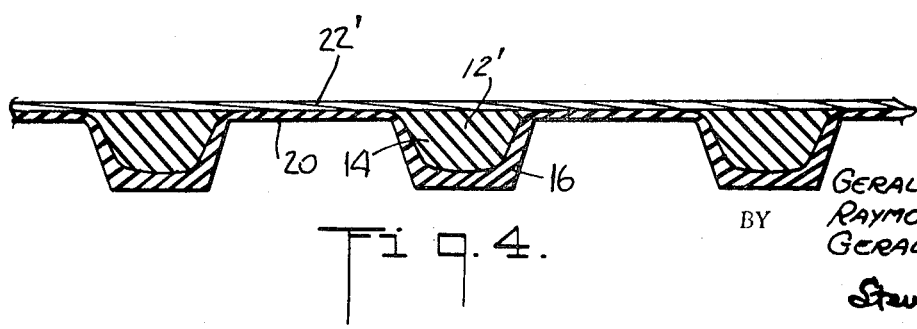

3,580,767
METHOD OF MAKING A TOOTHED DRIVE BELT WITH AN ABRASION RESISTANT URETHANE COATING ON THE TRANSMISSION SURFACE
Gerald L. Barnes, Palatine, Ill., and Raymond G. Cichy, South Bend, and Gerald E. Adams, Mishawaka, Ind., assignors to Uniroyal, Inc., New York, N.Y.
Filed Mar. 28, 1969, Ser. No. 811,514
Int. Cl. F16g *1/00;* B29n *7/22*
U.S. Cl. 156—138                                7 Claims

ABSTRACT OF THE DISCLOSURE

A toothed belt to be used in a positive transmission drive, and a method for manufacturing the said belt. According to the method, a grooved mandrel is coated with a skin coating of a wear and abrasion resistant elastomeric material. A highly viscous tooth filler compound, which is also an elastomeric material, is then applied filling the grooves of the mandrel and covering the entire surface of the skin coating forming the major portion of the belt teeth. Either before or after the filling of the grooves with the filler compound, and before the curing of the filler compound, a reinforcing filament is helically wound around the mandrel and at least partially embedded within the filler compound. Thereafter the mandrel and said coatings are placed in an oven and cured. The cured belt can then be stripped from the mandrel and may be cut into individual belts of smaller width if desired. The belt resulting from this method will have a wear and abrasion resistant elastomeric coating which covers a less wear resistant elastomeric layer. The reinforcing filament is separated from the teeth of the gears which coact with the belt by the wear and abrasion resistant coating.

BACKGROUND OF THE INVENTION

The present invention relates to toothed belts for forming a positive drive, and to a method for manufacturing such belts.

Toothed drive belts for transmitting rotary movement from a drive gear to a driven gear are already known. Such belts conventionally have their drive-transmitting teeth distributed along the inner surface of the endless belt. While elastomeric materials are used for such toothed belts, these materials are reinforced by a reinforcing cord embedded in the belt material. It is conventional to cover the inner surface of such a belt with a layer of fabric.

In the most common method of manufacture of a conventional belt, the fabric layer is positioned over the exterior surface of a suitable grooved mandrel. In the case where no fabric is used, the reinforcing filament is wound directly in engagement with the mandrel at the lands between the grooves in the mandrel. Then the elastomeric groove-filling material is applied through and around the filament into the grooves of the mandrel to fill the latter and around the convolutions of the filament to embed the latter within this elastomeric material. Thereafter, curing takes place and the product is stripped from the mandrel so that, if desired, it may be cut into suitable widths to form a plurality of motion-transmitting belts.

One of the primary difficulties encountered with belts of the conventional type resides in the fact that a fabric covering layer does not have good wear resistant properties. First, the elastomeric belt material and then the reinforcing filament are rapidly exposed by the wearing action of the gears which coact with the belt. The fabric in the land portions suffiers the most wear since it comes into direct engagement with the end surfaces of the gear teeth. In as much as such gears may be of metal or other hard materials, the result is rapid exposure of the reinforcing filament, with resulting wear of the filament. Of course, where the reinforcing filament is wound directly onto the mandrel, it will quickly become exposed at the lands between the teeth of the belt. In either case, the reinforcing elements become exposed to wearing action due to direct contact with the teeth. Such wearing action causes earlier belt failure and accordingly should be avoided. Additionally, due to the nature of the fabric covering, there is a tendency for conventional belts to overheat which can also cause belt failure.

SUMMARY OF THE INVENTION

It is accordingly a primary object of the present invention to provide a belt and method for manufacturing the same which will avoid the above drawbacks.

In particular, it is an object of the invention to provide for a belt of the above type having a belt tooth covering which is far more wear and abrasion resistant than conventional fabric materials.

Also, it is an object of the invention to provide a method which will enable a belt of the above type to be manufactured by a series of simple, inexpensive steps which can be carried out rapidly and conveniently without the use of any special or expensive equipment and with manipulations which are simple to perform, so as to achieve from this method a belt which will have an operating life far longer than conventional belts without any substantial increase in the cost of the belt.

According to the method of the invention a wear and abrasion resistant elastomeric material is sprayed onto a grooved mandrel to form a skin coating. It is partially cured and a highly viscous elastomeric filler compound is then appled in an amount sufficient to fill the coated grooves of the mandrel, and cover the coating in the land area to a predetermined thickness. Either before or after the filling of the grooves with the viscous filler compound a reinforcing cord of filament is wound around the mandrel. When the reinforcing filament is wound after deposition of the filler compound, it is wound tightly enough to be pulled through the body of the filler compound into engagement with the land portions of the skin coating. When the filament is wound directly on the skin coating, before deposition of the filler compound, the filler compound is passed through spaces between convolutions of the filament. After the elastomeric materials and the reinforcing filament have been placed on the mandrel, the entire assembly is cured. After curing, the product on the mandrel is stripped off and cut into desired widths, as required. The belt of the invention will have at its inner working surface an exposed coating of a high wear and abrasion resistant character which protects the entire belt and separates the reinforcing filament from the gear teeth in order to achieve a belt of long operating life.

BRIEF DESCRIPTION OF DRAWINGS

The belt and belt-manufacturing method of the invention are illustrated, by way of example, in the accompanying drawings which form part of this application and in which:

FIG. 1 is a fragmentary longitudinal sectional view of the preferred embodiment of a belt according to the present invention;

FIG. 2 is a transverse sectional vew schematically illustrating a grooved mandrel used in the manufacture of the belt of FIG. 1;

FIG. 3 is a fragmentary transverse sectional view on an enlarged scale as compared to FIG. 2, showing part of the mandrel of FIG. 2 with the belt structure thereon during manufacture of the belt;

FIG. 4 is a fragmentary longitudinal sectional view of another embodiment of the belt of the present invention; and FIG. 5 is a transverse sectional view of the embodiment of the invention shown in FIG. 4.

DESCRIPTION OF PREFERRED EMBODIMENT

Referring to FIG. 1, it will be seen that the endless toothed drive belt 10 of the preferred embodiment of the present invention has teeth 11 situated along the inner surface of the belt which are designed to coact with the gear (not shown) around which the belt is positioned when in use. The teeth 11 extend transversely across and are uniformly spaced along the belt 10.

The belt 10 has an inner layer 12 of an elastomeric material such as urethane rubber which extends along the entire length of the belt 10. Part of layer 12 forms the inner core 14 of teeth 11. The lower surface of the layer 12 is covered with a skin 16 made of an elastomeric material such as an urethane rubber of high wear and abrasion resistant character as more fully described hereinafter. The layer 12 and skin 16 are intimately and permanently bonded to each other. The thickness of the skin 16 is exaggerated in the drawing to more clearly illustrate the relationship of the elements of the belt. The skin 16 has teeth portions 18 which form the covering of teeth 11 and portions 20 which cover the land area 13 spaced between the teeth portions 11. The land portions 13 engage the outer end surfaces of the gear teeth of the gear around which the belt 10 is guided.

A reinforcing filament or cord 22, made of a substantially non-stretchable material, is embedded at least partially in the layer 12 and contacts the land portions 20 of skin 16. The land portions 20 of skin 16 maintain the reinforcing filament 22 spaced from the teeth of the gear with which the belt 10 coacts. This reinforcing filament 22 is helically wound along the endless belt 10. The skin 16 protects the elastomeric layer 12 including teeth core 14 and the reinforcing cord 22, in order that a long operating life is assured for the belt of the invention.

This toothed transmission belt of the invention is manufactured on a mandrel 24 shown in transverse section in FIG. 2. FIG. 3 illustrates a stage during the manufacture of the belt 10.

The mandrel 24 is of an elongated substantially cylindrical configuration and made of any suitable solid, substantially rigid materal. The ends of the mandirel may be provded with end plates 26, one of which is apparent in FIG. 2. Openings 28 are provided in end plates 26 so that air may circulate through the interior of the mandrel 24. A shaft 30 extends through and is fixed to the end plates 26, so that the entire assembly can be mounted on a suitable machine for winding the reinforcing filament 22 helically around the mandrel in a manner referred to in greater detail below. The cylidrical wall 32 of the mandrel is formed with axially extending grooves 34 of a substantially trapezoidal cross section. Groove 24 may have any other cross section and is determined by the desired configuration of the belt teeth 11. These grooves 34 are uniformly distributed about and extend parallel to the axis of the mandrel. It will be noted that between the grooves 34 the mandrel has lands 36.

The mandrel 24 may be made of any substantially rigid material having suitable heat resistant qualities such as certain plastics, metals, woods or glass.

Initially the exterior surface of the building form or mandrel 24 is treated with a release agent. This release agent is in the form of a mold lubricant having a composition depending primarily upon the type of mandrel which is used. Various waxes, silicones, stearates and other common separators can be used successfully.

The skin 16 is then applied to the mandrel, covering the entire exterior surface thereof so that the lands 36 and the surfaces which define the grooves 34 are all completely covered by the skin 16. A self-curing liquid urethane rubber of high wear and abrasion resistant character is the preferred material for the skin 16. It has been found that a liquid urethane rubber having a molecular weight in the range of 2000 and which is the reaction product of diisocyanate and a polyalkylenether glycol has the necessary wear characteristics. The liquid urethane rubber (a prepolymer) should contain a curing agent such as methylene-di-aniline. Alternatively conventional two component urethane spray systems may be used.

The skin coating 16 is preferably applied by electrostatic spray techniques. The resulting skin coating 16 has a valuable thickness, the thickest portions being on the bottom and sides of the teeth as illustrated.

The mandrel 24 is then allowed to set for a sufficient time for a partial air curing of the skin 16. Then the material forming layer 12 (a high viscosity polyurethane of lower molecular weight) is applied by using such means as a squeegee. This polyurethane can have a suitable preservative added to increase its viscosity. A curing agent can be added just before the polyurethane is to be applied.

Before the high viscosity layer is cured, the surface of the building form is helically wound with the reinforcing filament 22. During the winding operation the reinforcing cord 22 is pulled into the urethane layer 12 until it becomes situated next to the partially cured land portion of the wear resistant coating and thus become at least partially embedded in the urethane layer 12.

Normally the depth of layer 12 is selected so as to completely embed the reinforcing filament 22 when it is positioned in contact with the land portion 20 of skin 16. However, as seen in FIGS. 4 and 5, the depth of layer 12' can be selected to only partially embed the filament 22' into the layer 12'.

After the reinforcing filament is thus wound, the entire form is placed in a curing oven to accelerate the full cure of the skin coating 16 and urethane layer 12. The belt is then stripped from the form and cut into desired widths.

While the method set forth above is preferred, the order of applying the urethane layer 12 and the reinforcing filament 22 can be reversed, so that the step of winding the reinforcing filament takes place before deposition of the urethane layer 12. The convolutions of the helically wound reinforcing filament are spaced from each other so that the layer 12 can be deposited by a squeegee or other suitable means in such a manner that it is forced between the convolutions of the reinforcing filament to completely fill the grooves and surround or extend partly around the filament so that the latter becomes at least partially embedded in the layer 12.

The preferred reinforcing cord is a continuous filament glass yarn impregnated with a suitable rubber such as a butadiene acrylonitric rubber or estane, a thermoplastic polyurethane. Many other reinforcing fibers and filaments can be used, such as nylon, polyurethane impregnated Dacron, cotton cord, linen cord, silk, wire, jute or rayon.

The following example will serve to illustrate the practice of the invention in more detail.

EXAMPLE

The formulation sprayed to form skin 16 was prepared by admixing two solutions and a wetting agent. The first solution consisted of a polyether polyurethane (approximate molecular weight of 2000 and sold under the tradename Adiprene L–100) diluted to 50 wt. percent total solids in methyl ethyl ketone. The second solution consisted of 4,4-methylene-di-aniline (MDA) diluted with methyl ethyl ketone to 10 wt. percent total solids. Two hundred parts by weight of the first solution were mixed with eighty parts of the second and 0.25 part of a wetting agent (Silicone SF–1034). Brulin 406–1, a commercial mold lubricant, was applied to the mandrel before the skin 16 was applied. The skin 16 was deposited on the mandrel to a thickness which varied between .001 to .01 inch by use of standard electrostatic spray techniques.

After spraying onto the mandrel, the material was allowed to dry for 15 minutes under ambient room conditions to complete the reaction.

After allowing sufficient time for partial air curing of the skin coating 16, the layer 12, also of a urethane composition was applied. The urethane composition was of high viscosity and consisted of a polyurethane having an approximate molecular weight of 1300 (trade named Adiprene L–167) combined with a solution of MDA diluted with methyl ethyl ketone to 23 wt. percent total solids. 100 parts by weight of the polyurethane were mixed with 6.5 parts of the solution.

The addition of MDA increases the viscosity of the Adiprene L–167. The shelf life of the mixture is in excess of 2 days in a closed container. Just prior to use, 18 grams of melted Methylene-bis-orthochloroaniline heated to 250° F. per 100 grams of the above high viscosity composition were added as a curing agent.

This high viscosity composition was coated onto the mandrel prepared as set forth above, so as to complete the filling of the grooves and so as to cover the entire surface. A substantially cylindrical outer surface was produced, having a radial thickness of approximately .003 inch at the land area. Before layer 12 was cured, the surface of the mandrel was helically wound with a glass fiber filament 22 impregnated with a butadiene acrylonitrite (sold undner the trade name Paracril). The reinforcing filament 22 had an approximate diameter of 0.010 inch and each revolution was spaced from adjacent revolutions by approximately 0.050" on center. This reinforcing cord was pulled into the urethane layer and completely adhered to it. The entire form was then placed in a curing oven for 3 hours at 200° F. The resulting belt runs appreciably cooler than conventional belts and the skin coating lasts longer in use than conventional fabric layers.

While the preferred form of this invention has been described herein it is to be understood that still other changes may be made without departing from the spirit of the invention and the scope of the appended claims, and it is intended to cover all such changes in such claims.

Having thus described my invention, what I claim and desire to protect by Letters Patent is:

1. In a method for manufacturing a toothed belt, the steps of covering the surface of a grooved mandrel with an elastomeric skin coating of wear and abrasion resistant material; covering the skin coating and filling the unfilled portion of the grooves of the mandrel with an elastomeric tooth filler compound of different composition from that of said skin coating and winding a reinforcing filament around the skin coating, whereupon the reinforcing filament is at least partially embedded within the tooth filler compound; thereafter curing the elastomeric materials while they remain on the mandrel, and then stripping the cured elastomeric materials from the mandrel, to achieve a toothed belt having teeth with a wear and abrasion resistant surface which extends over the surface of the teeth.

2. A method as recited in claim 1 wherein said reinforcing filament is wound around mandrel and is in contact with said skin coating prior to filling of the grooves with said filler compound, and said filler compound being applied through spaces between the filament convolutions into the grooves, so as to cover the land portion of said skin coating and at least partially embedding the said filament in the said filler compound.

3. A method as recited in claim 1 wherein said skin coating is covered by said filler compound prior to winding of the reinforcing filament, and said reinforcing filament when wound around the mandrel is embedded at least partially into the filler compound.

4. A method as recited in claim 1 wherein said skin coating is a sprayed urethane compound.

5. A method as recited in claim 4 wherein the surface of the mandrel is covered with a release agent prior to covering said surface with said skin coating.

6. A method as recited in claim 1 wherein prior to the winding of said filament and the covering of the skin coating with a filler compound, the skin coating is at least partially cured.

7. A method as recited in claim 5 wherein said filler compound is an urethane rubber.

No references cited.

BENJAMIN R. PADGETT, Primary Examiner

R. L. TATE, Assistant Examiner

U.S. Cl. X.R.

74—237; 156—173